(12) United States Patent
Jenkins

(10) Patent No.: US 12,313,365 B1
(45) Date of Patent: May 27, 2025

(54) SKELETONIZED BOLT CARRIER FOR AN AK RIFLE

(71) Applicant: Aaron Jenkins, Fort Pierce, FL (US)

(72) Inventor: Aaron Jenkins, Fort Pierce, FL (US)

( * ) Notice: Subject to any disclaimer, the term of this patent is extended or adjusted under 35 U.S.C. 154(b) by 0 days.

(21) Appl. No.: 18/628,245

(22) Filed: Apr. 5, 2024

(51) Int. Cl.
  *F41A 3/26* (2006.01)
  *B23C 3/10* (2006.01)
  *F41A 5/28* (2006.01)

(52) U.S. Cl.
  CPC .................. *F41A 3/26* (2013.01); *B23C 3/10* (2013.01); *F41A 5/28* (2013.01)

(58) Field of Classification Search
  CPC .................. F41A 3/26; F41A 5/28; B23C 3/10
  See application file for complete search history.

(56) References Cited

U.S. PATENT DOCUMENTS

| 11,125,515 B2 | 9/2021 | Vehr | |
|---|---|---|---|
| 2022/0236032 A1* | 7/2022 | Hamilton | .................. F41A 3/74 |

OTHER PUBLICATIONS

Fail Zero Lightweight Bolt Carrier Group, https://www.youtube.com/watch?v=ydLOJgLZvqw, Jan. 30, 2018.
The Century American AK-47 is One of the Best Made, https://www.guns.com/news/review/centurys-american-ak-47-one-best-made-video, Apr. 9, 2014 Jim Grant.
Apex Gun Parts, https://www.apexgunparts.com/c39-ak-bolt-carrier-skeletonized-very-good.html.
Know your AK, https://www.strategicfront.org/forums/threads/know-your-ak.382/, Dec. 11, 2017.

* cited by examiner

*Primary Examiner* — Rick K Chang
(74) *Attorney, Agent, or Firm* — My Patent Guys; Christopher Pilling; Colton Bangs

(57) ABSTRACT

A skeletonized bolt carrier for an AK rifle is provided. The bolt carrier features a skeletonized operating rod to reduce overall weight while maintaining structural integrity. The bolt carrier also features side indents cut out of both sides of the base block which further reduce weight. The reduced weight of the bolt carrier enables lower gas consumption when firing, resulting in less recoil and less associated muzzle rise, leading to improved accuracy especially when multiple rounds are fired consecutively.

7 Claims, 5 Drawing Sheets

SKELETONIZED BOLT CARRIER FOR AN AK RIFLE

CROSS-REFERENCE TO RELATED APPLICATIONS

N/A

BACKGROUND OF THE INVENTION

1. Field of the Invention

The present invention relates to bolt carriers for firearms but more particularly a skeletonized bolt carrier for an AK rifle, such as an AK-47 or AKM.

2. Description of Related Art

The Avtomat Kalashnikova 1947, also known as the AK-47, is still one of the most popular and widely used firearms after its first manufacture almost 80 years ago. Its popularity can be attributed to its relatively low manufacturing cost, ease of use and reliability. It is a gas-powered rifle with semi and fully-automatic settings. Integral to its function as an automatic rifle is the bolt carrier, which is a long slender component near the top of the firearm that houses the bolt and which moves backwards and forwards while the trigger is held, to facilitate loading and unloading of cartridges from the magazine.

While the AK-47 is known for its reliability and ease of use, it is also known for its relative inaccuracy, high gas use, heavy weight, and recoil. Muzzle rise is an important aspect of the recoil from multiple shots in quick succession, which results in the front end of the barrel rising up, making it harder to maintain target accuracy. Reducing the weight and gas consumption of the AK-47 can not only make the firearm easier to carry and use, but also help reduce recoil and improve accuracy. However, it is important that the weight reduction does not compromise structural integrity and reliability of the firearm. Consequently, there is a need for optimization of the AK rifle bolt carrier to reduce its weight while maintaining the overall reliability of the firearm.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

What is needed in the art and has heretofore not been described is a lightweight, skeletonized bolt carrier for an AK rifle, including but not limited to the AK-47 and AKM (Avtomat Kalashnikova Modernizirovanny (Modernized)). This is achieved by removing unnecessary portions of material from the bolt carrier without jeopardizing its structural integrity and reliability. The resulting reduction in weight allows for less gas use when firing, less recoil, and less associated muzzle rise.

It is a particular object of the invention to provide a lighter and improved bolt carrier for an AK rifle through skeletonization.

In order to do this, in one aspect of the invention, a bolt carrier is provided, comprising a base block at one end, and an operating rod extending out of a top of the base block and extending forward a length to a front portion of the skeletonized bolt carrier, wherein the operating rod is comprised of a tubular shell and a hollow interior, having a plurality of cutouts passing through the tubular shell, and wherein the plurality of cutouts span the length and circumference of the operating rod.

In one embodiment, said base block has at least one side indent cut out of at least one side of the base block.

In another embodiment, the overall weight of the bolt carrier is less than 8 oz.

In another embodiment, the material of the bolt carrier is AISI 8620 forged steel.

In another embodiment, the plurality of cutouts span the entire length of the operating rod and the entire circumference from a rear end of an operating rod tip to a front end of a slotted guideway.

In another embodiment, the bolt carrier has an operating rod extending out of a top of the base block and extending forward a length to a front portion of the skeletonized bolt carrier, wherein the operating rod is comprised of a tubular shell and a hollow interior, having a plurality of stadium-shaped cutouts passing through the tubular shell, and wherein the plurality of stadium-shaped cutouts span the length of the operating rod in its entirety.

Further, a method for producing a skeletonized bolt carrier is provided, comprising steps: providing a stock bolt carrier from an AK rifle; removing an attached gas piston from the bolt carrier; cutting a plurality of cutouts in a tubular shell of the bolt carrier via a four-axis milling machine; and, attaching an adjustable gas piston to the bolt carrier.

In another embodiment, the four-axis milling machine is also used to mill side indents in both sides of a base block of the bolt carrier.

The foregoing has outlined rather broadly the more pertinent and important features of the present disclosure so that the detailed description of the invention that follows may be better understood and so that the present contribution to the art can be more fully appreciated. Additional features of the invention, which will be described hereinafter, form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE INVENTION

Figure 1:
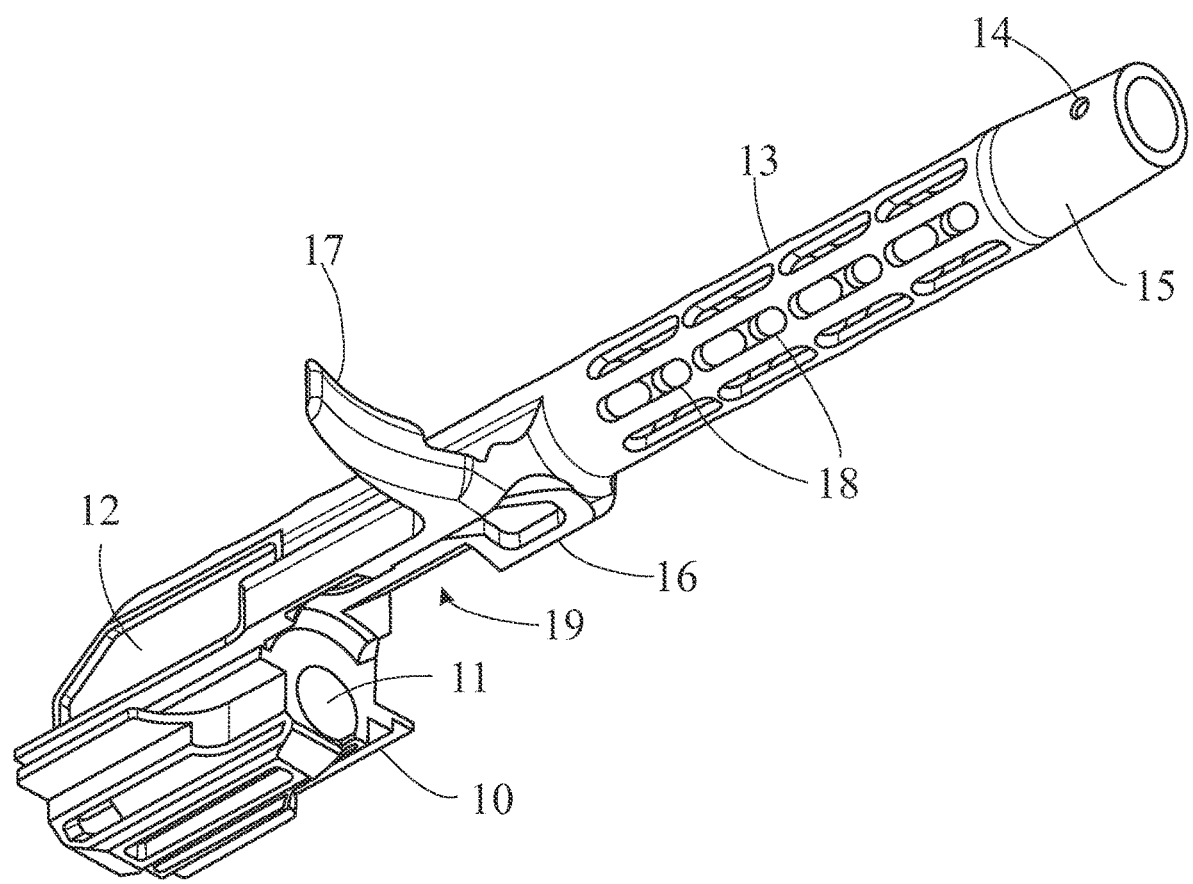
FIG. 1 is a bottom perspective view of a skeletonized bolt carrier according to an embodiment of the present invention.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a skeletonized bolt carrier for an AK rifle.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. The term "approximate" or "approximately," as used herein, shall refer to a range of values that are within [+/−10%] of a stated reference value. This range acknowledges the inherent variations found in manufacturing, measuring, and application processes, allowing for minor deviations that do not materially affect the novel functionality or utility of the invention. These terms generally refer to a range of numbers that one of skill in the art would consider equivalent to the recited values (i.e., having the same function or result). In many instances these terms may include numbers that are rounded to the nearest significant figure.

The invention functions as a bolt carrier within an AK rifle, such as the AK-47 or AKM, which is well known in the art but briefly summarized here. The bolt carrier is essential to the automatic firing mechanism of the AK rifle. When the bullet travels through the barrel as a result of the high pressure gasses behind it produced by the propellant charges in the cartridge, a portion of the gasses travel up through the gas port in the barrel and into the gas chamber. In the gas chamber the pressure builds up and pushes the gas piston backwards, which is connected to the front of the bolt carrier and in turn pushes the bolt carrier backwards along rails. When the bolt carrier reaches its furthest backward position, the return spring, which runs from the rear-end of the gas piston through the hollow center of the operating rod of the bolt carrier and to the inside rear surface of the receiver, becomes fully compressed and pushes the bolt carrier and gas piston forwards. As the bolt carrier moves forward, the bolt chambers the next round and the bolt carrier causes the hammer to strike the firing pin which hits the cartridge primer and ignites the propellant powder in the cartridge to produce high pressure gasses and start the entire process again.

Figure 2:
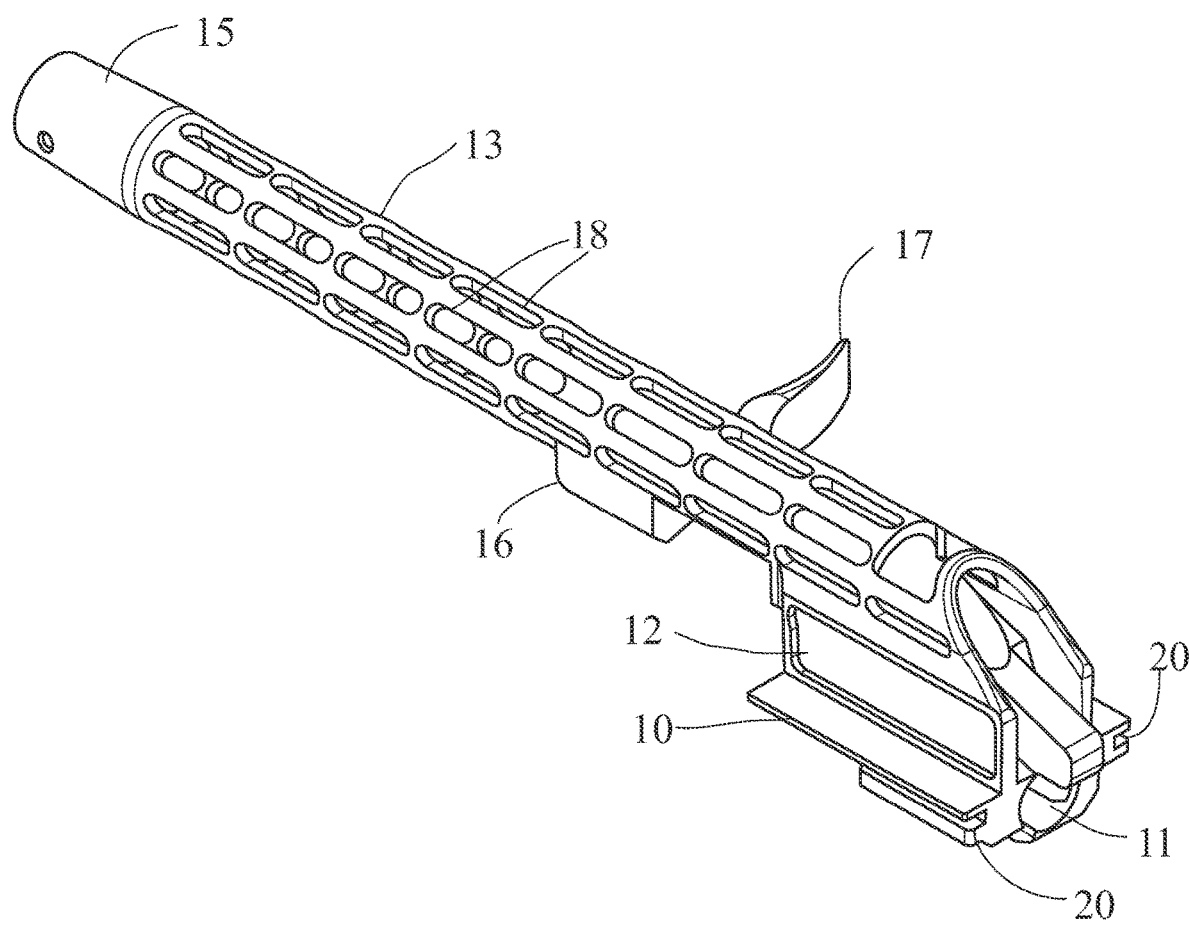
FIG. 2 is a top view of a skeletonized bolt carrier according to an embodiment of the present invention.
Figure 3:
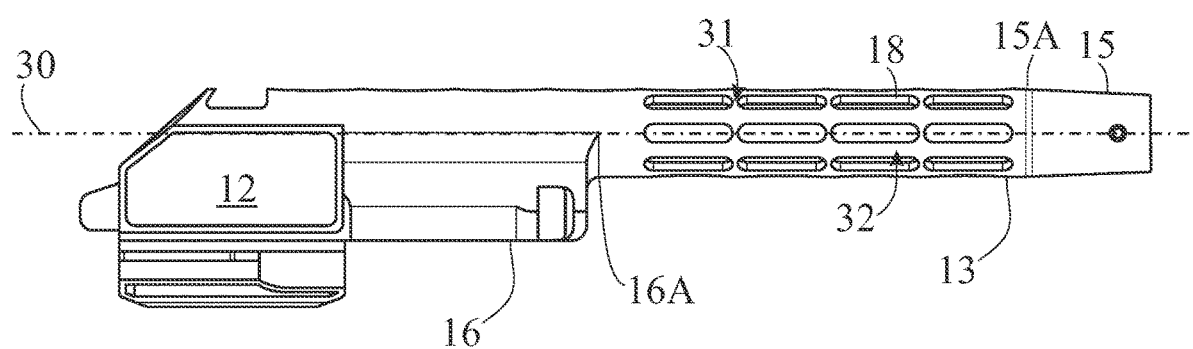
FIG. 3 is a side view of a skeletonized bolt carrier according to an embodiment of the present invention.
Figure 4:
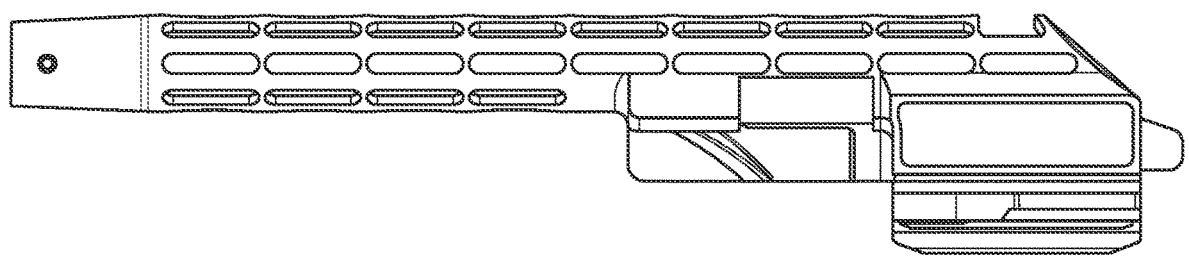
FIG. 4 is an opposite side view of a skeletonized bolt carrier according to an embodiment of the present invention.
Figure 5:
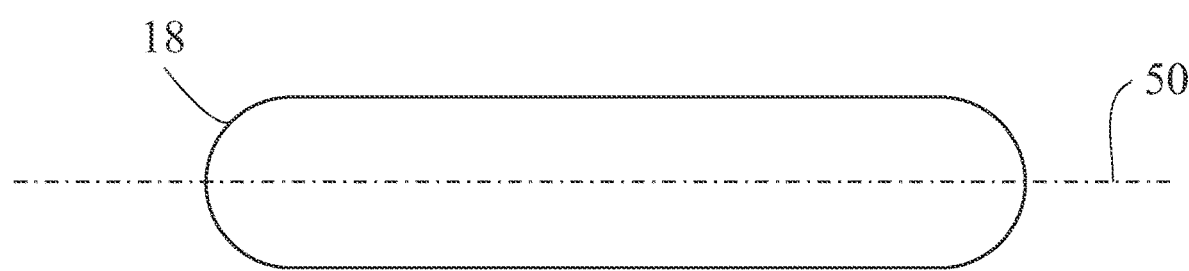
FIG. 5 is a top detailed view of a stadium-shaped cutout according to an embodiment of the present invention.

The invention can be better appreciated with reference to FIGS. 1-5. The bolt carrier has all of the normal components of an AK rifle bolt carrier as is well described by Davis in U.S. Pat. No. 7,261,029 B1, herein incorporated in its entirety at least by reference. The base block 10 is located at the bottom and rear of the bolt carrier and has grooves 20 on its opposite sides which contact the guide rails of the receiver (not shown) allowing the bolt carrier to slide backwards and forwards within the firearm along a first axis 30. In the center and bottom of the base block 10, sits the longitudinal bore 11 which houses the bolt (not shown). Molded out of the top of the base block 10 is the operating rod 13 which runs the entire length of the bolt carrier along the first axis 30. The operating rod 13 is hollow and the return spring (not shown) runs through its hollow center to contact the piston rod (not shown) which is attached to the operating rod 13 at the front of the operating rod 13 by means of thread (not shown) and a pin (not shown) which slides through the pinhole 14. The operating rod tip 15 is a solid-walled, slightly-tapering segment at the front end of the operating rod 13 which contains the pinhole 14 and piston rod threading (not shown). A slotted guideway 16 extends downwards from the operating rod 13 about halfway down the operating rod 13 with a first gap 19 located between the slotted guideway 16 and the base block 10. The slotted guideway 16 makes contact with a rail (not shown) within the receiver of the firearm along which it slides. Extending out of the right side of the slotted guideway 16 is the charging handle 17 which is used by the operator to manually pull the bolt carrier backwards in order to chamber the next round and prepare the firearm for firing.

In one embodiment, the operating rod 13 is traversed with stadium-shaped cutouts 18 along its length and circumference. In one embodiment, the cutouts 18 are lined up in rows with a second axis 50 (best seen in FIG. 5) of the stadium-shaped cutouts 18 running parallel with the first axis 30 of the firearm. In one embodiment, there are six of said rows of cutouts 18. In one embodiment, best illustrated in FIG. 3, the rows on the top of the operating rod 13 run the entire length of the operating rod 13 from the rear end 15A of the operating rod tip 15 to the rear end of the operating rod 13, and the rows of cutouts 18 on the bottom side of the operating rod 13 run from the rear end 15A of the operating rod tip 15 to approximately the front end 16A of the slotted guideway 16. In one embodiment, a second gap 31 between each adjacent cutout 18 within a row is small, while a third gap 32 between the rows is significantly larger.

In one embodiment, side indents 12 are located directly above the grooves 20 on either side of the base block 10. The side indents 12 are approximately rectangular cut out insets in the sides of the base block 10 which serve to reduce the overall weight of the bolt carrier.

In one embodiment, the skeletonized bolt carrier is made of AISI 86-20 forged steel, though other materials may be used, particularly other steel types. In one embodiment, the overall physical dimensions of the invention are the same as the physical dimensions of the standard AK bolt carrier, except for weight. In one embodiment, the weight of the present invention is 7.8 oz. compared to a standard bolt carrier weight of 11.5 oz. The reduction in weight enables greater accuracy with the firearm. When the bolt carrier is lighter, less pressure is required to move it backwards, which means that less gas is required. With less gas used, there is less recoil force and thus less muzzle rise, and with less muzzle rise it is easier for the operator to maintain the target. The weight reduction of the present invention is a significant advancement in the field.

In one embodiment, the skeletonized bolt carrier of the present invention is constructed or manufactured from a stock AK bolt carrier by using a four-axis milling machine to make machined cuts in the operating rod and base block of the stock bolt carrier. It should be understood that other methods could be used as well to manufacture the skeletonized bolt carrier, including but not limited to, producing the skeletonized bolt carrier directly using casting, forging, or three-dimensional printing.

It should be noted that the stock AK gas piston should be replaced with an adjustable gas piston in order for the skeletonized bolt carrier to function properly. The skeletonized bolt carrier and adjustable gas piston together serve to reduce recoil and prevent damage to the receiver from the gas piston and bolt carrier moving within the firearm with excessive force. The gas piston can be replaced using hand tools and by field-stripping the rifle. The adjustable gas piston has an adjustable vent hole, which the user can set the size of and which will determine how much pressure will build up in the gas chamber and thus how much force will be imparted on the gas piston and bolt carrier. In other embodiments, a predetermined gas piston having a reduced gas level specifically measured and accounted for the weight reduction of the present invention may be realized.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and etc. members throughout the disclosure (and in particular, claims) are not used to show a serial or numerical limitation but instead are used to distinguish or identify the various members of the group.

What is claimed is:

1. A skeletonized bolt carrier for an AK rifle, comprising:
a base block at one end;
an operating rod extending out of a top of the base block and extending forward a length to a front portion of the skeletonized bolt carrier, wherein the operating rod is comprised of a tubular shell and a hollow interior, having a plurality of cutouts passing through the tubular shell, and wherein the plurality of cutouts span a length and circumference of the operating rod;
wherein the plurality of cutouts span the circumference of the operating rod and the length of the operating rod from a rear end of an operating rod tip to a front end of a slotted guideway;
wherein the operating rod has six rows of the plurality of stadium-shaped cutouts, wherein the six rows of the shaped cutouts are positioned along the length of the operating rod from the rear end of the operating rod tip, to the rear end of the operating rod on a top side of the operating rod, and to a front end of the slotted guideway on a bottom side of the operating rod.

2. The skeletonized bolt carrier of claim 1, wherein the base block has at least one side indent cut out of at least one side of the base block.

3. The skeletonized bolt carrier of claim 1, wherein an overall weight of the bolt carrier is less than 8 oz.

4. A skeletonized bolt carrier for an AK rifle, comprising:
a base block at one end;
an operating rod extending out of a top of the base block and extending forward a length to a front portion of the skeletonized bolt carrier, wherein the operating rod is comprised of a tubular shell and a hollow interior, having a plurality of stadium-shaped cutouts passing through the tubular shell, and wherein the plurality of stadium-shaped cutouts span the length of the operating rod;
wherein the plurality of stadium-shaped cutouts span the circumference of the operating rod and the length of the operating rod from a rear end of an operating rod tip to a front end of a slotted guideway;
wherein the operating rod has six rows of the plurality of stadium-shaped cutouts, wherein the six rows of the plurality of stadium-shaped cutouts are positioned along the length of the operating rod from the rear end of the operating rod tip, to the rear end of the operating rod on a top side of the operating rod, and to a front end of the slotted guideway on a bottom side of the operating rod.

5. The skeletonized bolt carrier of claim 4, wherein said base block has at least one side indent cut out of at least one side of the base block.

6. The skeletonized bolt carrier of claim 4, wherein the overall weight of the bolt carrier is less than 8 oz.

7. The skeletonized bolt carrier of claim 4, wherein the skeletonized bolt carrier is constructed of AISI 8620 forged steel.

* * * * *